April 23, 1968 R. E. HILEMAN 3,380,050

DOPPLER FREQUENCY-TIME ERROR DETECTOR

Filed May 1, 1967

INVENTOR.
RONALD E. HILEMAN

BY Harry A. Herbert Jr. and George Fine

ATTORNEYS

United States Patent Office 3,380,050
Patented Apr. 23, 1968

3,380,050

DOPPLER FREQUENCY-TIME ERROR DETECTOR

Ronald E. Hileman, Clarence, N.Y., assignor to the United States of America as represented by the Secretary of the Air Force Filed May 1, 1967, Ser. No. 635,969
2 Claims. (Cl. 343—8)

ABSTRACT OF THE DISCLOSURE

A Doppler frequency-time error detector which includes a combination of two conventional integrate and dump filters and two phase detectors wherein the output of the first of the integrate and dump filters provides a reference signal to both phase detectors and the second integrate and dump filter is preceded by phase reversing means. The phase of output of the second integrate and dump filter is compared to the first for a time error signal and the output phase of the second is phase shifted 90° and then compared to the output phase of the first for a frequency error signal thus providing orthogonal time and frequency error signals.

Figures 1A, 1B, 1C, 2, 3:
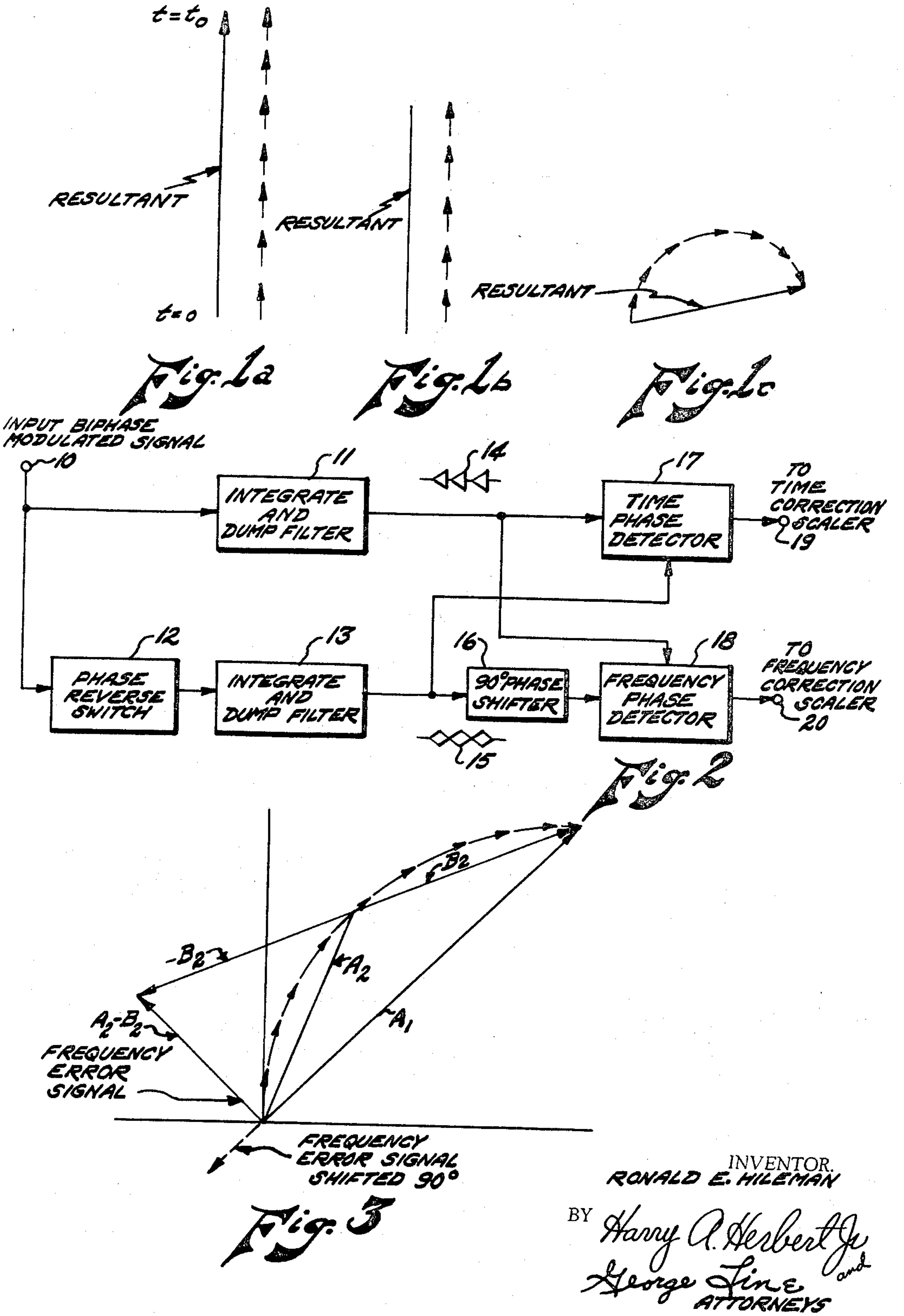

The present invention relates to time and frequency Doppler tracking systems, and more particularly, a time and frequency error detector included in a time and frequency Doppler tracking system.

Doppler time and frequency tracking loops in the past have required relatively large numbers of often duplicated components. The present invention eliminates this duplication of circuitry by providing orthogonal time and frequency error signals from two integrate and dump filters.

An object of the present invention is to provide a frequency-time error detector.

Another object of the present invention is to provide a frequency-time error detector including a pair of integrate and dump filters for deriving a frequency error signal as well as a time error signal.

The features of this invention, which are believed to be new, are set forth with particularity in the appended claims. The invention itself, however, together with further objects and advantages thereof may best be understood by reference to the following description when taken in conjunction with the accompanying drawings, in which:

FIGURE 1*a* is a vector diagram of the integrated input phasor of a carrier;

FIGURE 1*b* is curves showing the effects of a timing error;

FIGURE 1*c* is curves showing the effect of a frequency error;

FIGURE 2 illustrates a block diagram of a preferred embodiment of the present invention; and FIGURE 3 illustrates relation of frequency error signal to integrate and dump filters output signals.

The fundamental unit in a time and frequency tracking system is the integrate and dump filter (I&D). The integrate and dump filter is an oscillator with closed loop gain of exactly 1 causing the output to oscillate indefinitely at the same amplitude upon removal of the input signal. The oscillator tank energy is removed or dumped at the signal information rate so that the integrate and dump filter detects each bit without being influenced by the previous bit.

For an on-frequency input signal biphase modulated at the information rate, the integrate and dump filter output signal envelope is a saw tooth (the integral of the input pulse envelope). The output carrier is of the same frequency as the input and as a phase equivalent to the average phase of the input signal over the bit. FIGURE 1*a* is a vector diagram of the integrated input phasor of a carrier during bit length $t_0$. FIGURES 1*b* and 1*c* show the effects of timing and frequency errors respectively. The timing error caused by lack of sync between signal bit transitions and integrate and dump filter dump pulse does not permit the integration to occur over the entire bit $t_0$. The frequency error also causes a reduced integrate and dump filter output signal. More specifically, the desired linear envelope buildup of the integrate and dump filter output requires that the incoming signal be phase coherent with the signal already in the oscillator tank. The effect of the frequency error is to rotate the input signal vector with respect to the oscillator tank signal.

The time and frequency error detecting system of the present invention is shown in FIGURE 2. The input to terminal 10 is the aforementioned input biphase modulated signal which is fed simultaneously to integrate and dump filter 11 and phase reverse switch 12. The integrate and dump filters are conventional and may be such as described in U.S. Patent No. 3,056,890 issued Oct. 2, 1962. The output signal from conventional phase reverse switch 12 is fed to integrate and dump filter 13. Integrate and dump filter 13 is preceded by phase reversing switch 12 which reverses the phase of the input signal carrier at the mid bit point. Thus the typical output envelope of integrate and dump filter 13 will be a minimum at the dump time because the input signal amplitude is evenly divided between the two phases. The output signals from integrate and dump filters 11 and 13 are shown as waveforms 14 and 15, respectively. The output signal of integrate and dump filter 13 provides a reference signal to time phase detector 17 and frequency phase detector 18. Phase detectors 17 and 18 are of the conventional type.

Time tracking is achieved by comparing the phase of the output signal of integrate and dump filter 13 at the dump time with the phase of output signal from integrate and dump filter 11 by means of phase detector 17. The output signal from phase detector 17 is provided at terminal 19 which may be subsequently utilized in a time correction scaler. A phase difference at output terminal 19 indicates more energy in the second half of the phase-reversed bit. Hence a time correction is made to advance the phase of the dump pulse with respect to the received signal.

The novelty of the time-frequency detector is contained in the use of the same two integrate and dump filters for deriving the frequency error signal as well. FIGURE 3 is a phasor diagram of the signal present at the integrate and dump filter output at mid bit and dump time for a frequency up-shifted input signal. Note that the resultant vector in integrate and dump filter 13 (frequency error signal) is 90° out of phase with the signal in integrate and dump filter 11 (curve $A_1$). If the frequency of the input signal had been down-shifted instead, the error signal would be 180° from the error signal shown in FIGURE 3. Conventional 90° phase shifter 16 shown in FIGURE 2 rotates the frequency error signal to the axis of curve $A_1$. Frequency phase detector 18 compares the phase of curve $A_1$ and the rotated error signal and provides frequency correction signals by way of output terminal 20 to a frequency scaler. An adjusted synthesizer may drive a mixer ahead of the time and frequency detection system. It is noted that in FIGURE 3 curve $A_1$ shows the resultant phasor at dump time for integrate and dump filter 11. Curve $A_2$ illustrates phasor at mid bit for integrate and dump filter 13. Curve $B_2$ illustrates the phasor of the signal integrated over the last half bit for integrate and dump filter 13. Curve $A_2$–$B_2$ illustrates the error signal phasor for integrate and dump filter 13 which is at dump time.

The time-frequency detector illustrated in FIGURE 2 has been implemented in a Doppler tracking system used in the ground terminal receiver of a satellite communication system. The disclosed system eliminates the duplication of time and frequency correction loop equipment thereby reducing cost and complexity. The use of the phase reversed integrate and dump filter to obtain a frequency error signal provides a very large error signal for a small frequency error and and error signal independent of the information modulation.

For example, a frequency error of ¼T (where T is the integrate period) will cause a signal loss of 5 percent but will give an error signal that is 37 percent of the desired signal. An error signal of this magnitude is easily detected for use in a frequency correction loop.

Although only one specific embodiment of the invention has been shown and described, other changes and modifications will, of course, suggest themselves to those skilled in the art. Hence the invention is not to be limited to the embodiment shown because it has been shown merely for purposes of illustration. Thus, the true scope of the invention is not limited to the embodiment shown or the apparatus described, but is defined only in the appended claims.

What is claimed is:

1. A Doppler frequency-time error detector comprising a first integrate and dump filter, phase reversing means, said first integrate and dump filter and said phase reversing means receiving a common input biphase modulated signal, a second integrate and dump filter receiving the phase reversed output signal from said phase reversing means, first and second phase detectors receiving a common reference signal from said first integrate and dump filter, said first phase detector also receiving the output signal from said second integrate and dump filter for phase comparison purposes to provide an output signal therefrom representative of a time error, means for phase shifting a signal a preselected amount, said preselected phase shifting means interconnecting said second integrate and dump filter and said second phase detector, said second phase detector comparing the phase of the input signals thereto and providing an output signal representative of a frequency error.

2. A Doppler frequency-time error detector as described in claim 1 wherein said preselected phase shifting means consists of a 90° phase shifter.

References Cited

UNITED STATES PATENTS 3,113,308 12/1963 Stavis ---------------- 343—8

RICHARD A. FARLEY, *Primary Examiner.*

C. L. WHITHAM, *Assistant Examiner.*